United States Patent [19]

Evans et al.

[11] Patent Number: 4,463,118
[45] Date of Patent: Jul. 31, 1984

[54] OIL EXTENDED SILICONE ELASTOMER COMPOSITION

[75] Inventors: Edwin R. Evans, Clifton Park; John S. Razzano, Cohoes, both of N.Y.

[73] Assignee: General Electric Company, Waterford, N.Y.

[21] Appl. No.: 283,771

[22] Filed: Jul. 16, 1981

[51] Int. Cl.$^3$ .............................................. C08K 5/54
[52] U.S. Cl. .................................. 524/264; 525/477; 528/24; 528/32; 528/37; 528/43
[58] Field of Search ................. 260/33.6 SB; 525/477; 524/264

[56] References Cited
U.S. PATENT DOCUMENTS

| | | | |
|---|---|---|---|
| 3,109,826 | 11/1963 | Smith | 260/18 |
| 3,202,634 | 8/1965 | Merker | 525/477 |
| 3,696,068 | 10/1972 | Creamer | 260/29.1 B |
| 3,779,987 | 12/1973 | Razzano | 525/477 |
| 3,853,805 | 12/1974 | Miller et al. | 525/477 |
| 3,959,403 | 5/1976 | La Rochelle | 525/477 |

Primary Examiner—Joseph L. Schofer
Assistant Examiner—N. Sarofim

[57] ABSTRACT

A heat curable oil extended silicone elastomer composition and the cured silicone elastomers derived therefrom which exhibit improved melt flow and improved tear resistance at high filler loadings. A preferred composition comprises in admixture, a silarylenesiloxane polydiorganosiloxane block copolymer, a dimethylsilicone oil bearing vinyl-type unsaturation, a filler and a catalyst.

26 Claims, No Drawings

OIL EXTENDED SILICONE ELASTOMER COMPOSITION

The present invention relates to heat-curable crystalline silicone elastomer compositions and methods for making such compositions. More particularly, this invention relates to curable compositions of silarylenesiloxane polydiorganosiloxane block copolymers and a dimethylsilicone oil bearing vinyl type unsaturation and to the cross-linked silicone elastomers derived therefrom.

BACKGROUND OF THE INVENTION

The oil extension of hydrocarbon elastomer compositions is a practice used by manufacturers of such compositions and by fabricators of elastomeric products to lower durometer, improve processability, permit higher filler loadings, and decrease pound volume cost. This practice is also utilized to improve tear resistance over a range of filler loadings, to improve low temperature properties, and in the case of automobile tires, to improve the wear resistance.

The addition of silicone oils containing various functional groups, such as silanol, methoxy, amino, etc., to amorphous high molecular weight silicone elastomrs reinforced with high surface area fillers, as process aids, has been practiced to improve processability and to optimize properties of cured reinforced silicone elastomers. Oil extension of amorphous high molecular weight silicone elastomer compositions has not been practiced because of the severe reduction in the level of physical properties of the cured silicone elastomer compositions caused by even small amounts of such extender oils.

Merker teaches in U.S. Pat. No. 3,202,634 crystalline silarylenesiloxane block copolymers and condensation-curable compositions based thereon. At Column 8, line 69, and following he refers to the peroxide cure of variants of these copolymers containing alkenyl groups. However, following the brief teaching gives a cured polymer with such a tight cure that formation of the crystallites necessary for high strength properties of the cured composition is impeded.

Bobear discloses in U.S. Pat. No. 3,660,345 the addition of vinyl-on-chain sources for controlling the cross-link density of amorphous silicone elastomer compositions.

A silarylenesiloxane copolymer, crystalline in nature at ambient room temperature, with controllable cross-links density would provide a balance of high strength and toughness not found in the compositions of the prior art.

To make wire and cable jacketing or insulation from such compositions, the compositions are extruded on wire at temperatures sufficient to form a homogeneous melt, i.e., no crystallites, and the resultant extrudate is then cured by continuous vulcanization at 207° C. (maximum steam) with a 1-1½ minute residence time. An extruder barrel temperature of 110° C. (minimum) is necessary to provide the melt. The alkyl peroxide catalysts presently available having the highest activation temperatures and which provide the desired vulcanizate properties after 1-1½ minutes at 207° C. are, dicumylperoxide, with a 10 hour half-cure time at 115° C. and α,α'-bis(t-butylperoxy)diisopropylbenzene with a 10 hour half-cure time at 122° C. Unfortunately, the melt viscosity of the tough rubber compounds based upon silphenylene at these processing temperatures is somewhat high, and consequently, the heat-of-shear generated on mixing results in an internal extruder barrel temperature which is sufficient to activate the peroxides resulting in premature curing or scorching. The magnitude of the scorch problem is not fully realized until processing is carried out with a standard 3-inch extruder equipped with a 3:1 compression screw typically used for thermoplastics. The scorched material yields a grainy exterior surface demonstrating poor knitting which renders the product unacceptable.

The processability of these tough rubber compounds based on silphenylene via extrusion where the stock must be chemically cured, becomes critical due to the narrow processing temperature range between the extruder barrel temperature necessary to obtain a homogeneous melt and the temperature at which the peroxide catalysts become activated. Temperatures below this range result in an incomplete melt, and consequently, the ingredients are poorly mixed, and temperatures above this range result in premature curing or scorching of the product. It can be readily realized that it is desirable to expand this processing temperature range and to provide processability of the tough rubber compounds based on silphenylene, at temperatures above and below the currently recognized ranges. Under some circumstances, it may also be desirable to produce highly loaded compounds, i.e. high filler content, with good processability at substantially lower pound per volume costs.

SUMMARY OF THE INVENTION

The primary object of this invention is to provide novel blends of heat-curable crystalline silicone elastomers.

Another object of this invention is to provide heat-curable crystalline silicone elastomer blends having improved processability with high filler content.

Another object of this invention is to provide silarylenesiloxane copolymers having a broader processing temperature range.

Still another object of this invention is to provide additives for silarylenesiloxane copolymers which lower the durometer, improve processability, permit higher filler loadings and decrease pound volume cost.

Another object of this invention is to provide a silicone elastomer composition having improved tear resistance and improved low temperature properties over a broad range of filler loadings.

Another object of this invention is to provide an improved heat-curable silarylenesiloxane polymer composition which has a controlled cross-link density to result in a sufficiently low melt viscosity to minimize the generation of heat during the mixing process which might prematurely activate the catalyst in the curable polymer.

These and other objects are accomplished by a curable silicone elastomer composition blend comprising a silarylenesiloxane copolymer, a dimethylsilicone oil bearing vinyl-type unsaturation, a filler and a catalyst.

It has been discovered that, in accordance with the present invention, the addition of dimethylsilicone oils bearing vinyl type unsaturation to silarylenesiloxane copolymers, including those known as silphenylenes, results in a vulcanizate having a number of advantages, such as, improved tear resistance over a wide range of filler loadings, improved low temperature properties, lower durometer, improved processability and lower cost. The addition of vinyl-on-chain-containing oil also provides a superior polymer filler matrix which demonstrates improved retention of the vulcanizate properties at elevated temperatures. As used herein, the vinyl-on-chain oil (VOC) is a dimethylsilicone oil bearing vinyl-type unsaturation, and the VOC oil is a critical ingredient in the blends or compositions of the present invention.

It has been discovered that crystalline silarylenesiloxane copolymers can be oil extended to improve the processability of compositions containing such copolymers without significant loss of physical properties of the cured compositions by the addition of polydimethylsiloxane oils containing vinyl groups on the siloxane chain. It has been discovered further that polydimethylsiloxane oils containing vinyl groups on the siloxane chain can be utilized to control the cross-link density of crystalline silarylenesiloxane copolymers in order to optimize the physical properties of cured compositions containing such copolymers. Such extended and cross-link density controlled silarylenesiloxane copolymers exhibit improved processability and superior physical properties. The curable compositions of this invention comprise a crystalline silarylenesiloxane copolymer, a polydimethylsiloxane oil containing vinyl groups on the siloxane chain and a reinforcing filler. Such compositions can be extended or be controlled in cross-link density or extended and controlled depending on the level or levels of vinyl groups on the siloxane chain of the polydimethylsiloxane oils included in the compositions.

Further objects of the invention together with additional features and advantages thereof will become readily apparent to those skilled in the art in view of the following detailed description.

DETAILED DESCRIPTION OF PREFERRED EMBODIMENTS

Preferred curable polymeric compositions of this invention comprise blends or combinations of a silarylenesiloxane-polydiorganosiloxane block copolymer, a silicone oil bearing vinyl type unsaturation, and optionally, a conventional filler and co-agent or co-agents. The compositions of this invention are cross-linked or cured to a thermoset state by means of a conventional free radical forming catalysts, for example, an organic peroxide catalyst. In one preferred embodiment, the curable polymeric compositions of this invention are admixed with polyolefins, and the resulting blends are ideal for electrical insulation for electrical wire and cable and other conductors. The polyolefin/silarylenesiloxane-polydiorganosiloxane block copolymers containing a dimethylsilicone oil bearing vinyl-type unsaturation can also be used for molded goods. The special VOC oil in the silarylenesiloxane copolymer expands the processing temperature range and provides improved processability so that the resulting blends can be easily extruded, molded, compounded or otherwise used for various applications.

The preferred curable polymeric compositions of this invention comprise a silarylenesiloxane-polydiorganosiloxane block copolymer (silphenylene), a silicone oil having vinyl type unsaturation on the siloxane chain, a filler, and a catalyst in the following relative proportions in parts by weight, based upon the weight of the copolymer:

| Ingredients | Approximate Proportions | |
|---|---|---|
| | Broad Range | Preferred Range |
| Silphenylene copolymer | 100 | 100 |
| Filler | 0-150 | 20-100 |
| VOC Silicone Oil | 1-50 | 5-35 |
| Peroxide Curing Agent | 0.1-10 | 0.5-5 |

Silarylenesiloxane-polydiorganosiloxane block copolymers suitable for use in the composition of this invention are block copolymers made up of units of silarylenesiloxane having the general formula:

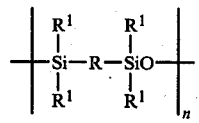

and units of diorganopolysiloxane of the general formula:

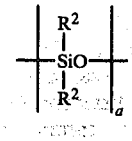

where n is an integer equal to from 1 to about 100, preferably an average of about 2 to about 50, R is a divalent aromatic organic radical, $R^1$ is a monovalent organic radical, a is an integer equal to from about 5 to about 10,000 inclusive, preferably an average of about 10 to about 1000, and $R^2$ is an organic radical selected from the group consisting of monovalent hydrocarbon radicals, unsaturated aliphatic radicals and halogenated radicals. In the foregoing general formulas, the preferred divalent aromatic radical, R includes, for example, divalent aromatic hydrocarbon radicals such as phenylene, tolylene, xylylene, naphthylene, 4,4'-biphenylene, 4,4'-diphenylene ether, and the like; and halogenated divalent aromatic hydrocarbon radicals such as chlorophenylene, bromonaphthalene, and the like. The preferred monovalent organic radicals $R^1$ include, for example, alkyl radicals having from 1 to about 10 carbon atoms, such as, methyl, ethyl, propyl and the like; aryl radicals such as phenyl, naphthyl and the like; alkaryl radicals such as tolyl, xylyl and the like; unsaturated aliphatic radicals, such as, vinyl, allyl, propenyl and the like; halogenated radicals of the foregoing, such as chlorophenyl, 3,3,3-trifluoropropyl and the like; and mixtures of the foregoing. R and $R^1$ can be more than one radical, respectively, and these radicals can be the same or different as previously defined. Thus, for example, R can be methyl radical, and $R^1$ can be a combination of ethyl and methyl radicals, or R can be a butyl radical and $R^1$ can be methyl and n-propyl, and the like.

Examples of organic radicals embraced by $R^2$ for preferred silanol-terminated polydiorganosiloxanes are organic radicals having from 1 to about 13 carbon atoms and include straight chain and/or branched chain monovalent hydrocarbon radicals, for example, alkyl radicals such as methyl, ethyl, propyl, butyl, isobutyl, isopropyl, heptyl, stearyl, and the like, or for example, aryl radicals, such as phenyl, tolyl, xylyl, naphthyl, and the like; unsaturated aliphatic radicals such as, vinyl allyl, propenyl and the like; and halogenated radicals of the foregoing, such as, chloromethyl, chlorophenyl, 3,3,3-trifluoropropyl and the like. $R^2$ can be more than one radical. For example, $R^2$ can be a combination of methyl and phenyl; methyl, n-propyl and chloromethyl; and the like.

Preferred silarylenesiloxane copolymers of the present invention have inherent viscosities of from about 1 to about 2 dl/g at a concentration of 0.5 g/dl in toluene at 25° C.

The preferred silarylenesiloxane block copolymers contain copolymeric molecules consisting essentially of (a) amorphous segments consisting of linked repeating units of the formula $R_2{}^2SiO$ having an average minimum number of at least 10 units of $R_2{}^2SiO$ and (b) crystallite segments consisting of linked repeating units of the formula $-SiR_2{}^1-R-R_2{}^1SiO-$ having an average minimum number of at least 3 units of $-SiR_2{}^1-R-R_2{}^1SiO-$, where each $R^2$ is a monovalent alkyl radical or halogenated monovalent alkyl radical having from about 1 to about 8 carbon atoms, each $R^1$ is a monovalent organic radical and R is a divalent aromatic radical, the molar ratio of total $R_2{}^2SiO$ units to total $-SiR_2{}^1-R-R_2{}^1SiO-$ units ranging from about 10:90 to about 95:5, and where R, $R^1$ and $R^2$ are the same as defined above.

The silicone oil having vinyl-type unsaturation can be blended directly with the silarylenesiloxane copolymer or added in the form of a masterbatch with a filler, such as, fume silica or hydrated alumina, to facilitate dispersion. The compositions are suitably cross-linked, by free radical catalysts including, for example, commercial peroxides such as dicumyl peroxide which may be added last to the blended compositions to preclude scorching or premature curing. The oil additives are generally polysiloxanes which contain unsaturated aliphatic radicals attached to some of the silicon atoms of the siloxane, and are discussed in more detail below.

The polymeric compositions of this invention are cross-linked or cured to a thermoset state by adding a curing agent and heating the blend to its curing temperature. Curing temperatures range from about 149° C. to about 218° C. depending upon the ingredients and the time available for curing. Effectively usable curing agents comprise those materials which will affect a cross-linking cure of the polymers, such as organic peroxides which decompose to provide free radicals upon exposure to increased temperatures. Tertiary organic peroxides, such as, dicumylperoxide, are preferred because their temperature levels for decomposition and activation of the cross-linking curing are in a practical range for most manufacturing operations. Suitable peroxide curing systems for the compositions of this invention are further described in U.S. Pat. Nos. 2,888,424; 3,079,370; 3,086,966; and 3,214,422. Examples of useful tertiary organic diperoxides include 2,5-dimethyl-2,5(t-butyl peroxy)hexane; 2,5-dimethyl-2,5(t-butyl peroxy) hexyne-3; $\alpha,\alpha'$-bis(t-butylperoxy) diisopropyl benzene; and similar compounds.

The ratio of peroxide curing agent to the silphenylene material is not critical in the practice of the present invention and depends upon the physical and chemical properties desired in the cured product, such as the degree of solvent resistance or hot tensile strength. Amounts of peroxide curing agent of from about 0.25 percent to about 10 percent by weight of the silarylenesiloxane copolymer satisfy most requirements, and typically proportions of about 0.5 percent to about 1.5 percent based upon the weight of the silarylenesiloxane copolymer suffice for compositions for most applications.

The preferred peroxide curing agents for use in the present invention are dicumylperoxide and $\alpha,\alpha'$-bis(t-butylperoxy) diisopropylbenzene.

The silicone oils of the present invention bearing a low level of vinyl-type unsaturation sites either on the chain and/or as terminal vinyl groups, have a level of unsaturation of less than 1 mole percent and preferably in the range of about 0.05 to about 0.7 mole percent vinyl. These oils are sometimes referred to as low vinyl oils. The unsaturated aliphatic radicals upon the silicon atoms of the polysiloxane are referred to herein as vinyl-type unsaturation, and the preferred oil additives are generally the dimethylpolysiloxanes bearing unsaturated aliphatic radicals including the halogenated derivatives thereof. Examples of the unsaturated aliphatic radicals include vinyl, allyl and similar alkenyl radicals attached to the silicon atoms. Generally only one type of unsaturated aliphatic radical is present in a particular polysiloxane, however, the present invention also embraces those embodiments in which more than one type of unsaturated aliphatic radical is present in a particular polysiloxane. The oil preferably has a viscosity in the range of about 500 to about 25,000 centistokes. Silicone oils containing about 0.5 to 0.6 mole percent vinyl-on-chain and having a viscosity of about 20,000 centistokes or containing about 0.6 mole percent vinyl-on-chain and having a 700 centistokes viscosity have been demonstrated suitable for this purpose, with the former being particularly preferred. The sites of unsaturation permit the low vinyl oil to be incorporated via cross-linking into the polymer matrix. The vinyl-on-chain only oils which do not have terminal vinyl groups, are preferred for plasticization since the absence of terminal vinyl groups will preclude chain extension. Chain extension would diminish or partially destroy the effect on function of the oil in the polymer.

The silicone low vinyl oils can be added as extenders at a level necessary to maximize a particular property, however, a range of about 1 to about 40 parts per hundred parts of the silarylenesiloxane copolymer has been found to be useful for increasing the filler loading with a suitable degree of retention of vulcanizate properties. In addition, it has been found that the addition of between about 5 and 10 parts of said silicone oil per hundred parts of the copolymer will sufficiently lower the melt viscosity at 110° C. to preclude the generation of enough heat on mixing to activate the peroxides. The amount of silicone low vinyl oil needed to affect a lowering of the melt viscosity is a function of the following: molecular weight of the polymer, filler loading, the type of peroxide and the vulcanizate properties acceptable to the fabricator.

In certain preferred embodiments, the silicone elastomer composition blend not only comprises the silarylenesiloxane copolymer, a dimethyl silicone oil bearing a low level of vinyl-type unsaturation, a catalyst, and optionally, a filler, but also comprises a dimethyl silicone oil bearing a high level of vinyl-type unsaturation (high vinyl oil). The high vinyl oil may be added after the blending of the copolymer, the low vinyl oil, the catalyst and the filler, and prior to curing. Thus, the silicone elastomer composition may be intimately mixed before or while the addition of the high vinyl oil is carried out, preferably while the silicone elastomer (silphenylene copolymer) blend is above the crystalline melting point of the copolymer. The high vinyl oil is preferably a dimethyl silicone gum or a dimethyl silicone oil or a mixture thereof. In one specific embodiment, the addition of M-stopped vinyl-on-chain dimethyl silicone gums or fluids as a high vinyl oil containing between about 0.6 mole percent to about 13.5 mole percent vinyl-on-chain vinyl groups to provide a total vinyl-on-chain content in the final blend from this vinyl source of about 0.01 mole percent to about 0.50 mole percent vinyl-on-chain vinyl groups in the copolymer, provides vulcanizates which demonstrate optimum physical properties with no detectable inhibition of crystallite formation. The high vinyl oil may range in viscosity from about 700 centipoise to about 400,000 centipoise, preferably from about 2,000 centipoise to about 250,000 centipoise.

The method of preparing the silicone elastomer blends comprises preparing a mixture of silarylenesiloxane copolymer, a dimethyl silicone oil bearing a low level of vinyl-type unsaturation, a catalyst and optionally, a filler to form an elastomer stock. A high vinyl oil is added to this blend or mixture and mixed until well-blended. The resultant mixture is heated to cure the blend. This method of addition of high vinyl oil provides a very great degree of control over the cross-link density.

The curing of the blend or mixture, and the post-curing of the cured copolymer (blend or mixture) is not critical, and may be accomplished by any conventional curing and post-curing techniques. Generally the material mixture or blend is cured by heating the mixture at a temperature and for a period of time sufficient to cure the copolymer, and the cured copolymer at a temperature and for a period of time sufficient to post-cure the copolymer. In preferred embodiments, the mixture or blend is heated at about 150° C. to about 200° C. for about 5 minutes to about 2.0 hours to carry out the cure of the copolymer, and the cured copolymer containing the additional extender material is heated at about 150° C. to about 275° C. for about 5 minutes to about 2.0 hours to carry out the post-cure of the copolymer.

The low vinyl oil may be the same material as the high vinyl oil provided it is of the appropriate vinyl-content and viscosity.

As mentioned above, a conventional filler or fillers can be used in the invention; for example, the filler can be hydrated alumina, aluminum oxide, titanium dioxide, carbon black or fumed silica. Particle size and form of the filler are not critical, but in preferred embodiments, the filler has a relatively fine particle size of from about 20 millimicrons to about 1 micron. Particularly preferred filler is fumed silica.

The polymeric compositions of this invention can include other ingredients, adjuvants, additives and co-agents, depending upon the intended service of the product and the required or desired properties. These co-agents or additives may be added at any point in the mixing procedure before curing or as a masterbatch with one of the other ingredients. For example, other components may comprise antioxidants, preservatives, lubricants, mold release agents, pigments or coloring agents, inorganic fillers, processing aids, waterproofing agents, coupling agents and the like. Specific co-agents may be used to improve the modulus and to increase the rate of cure and cross-link density. These co-agents may be, for example, ethylene dimethacrylate, p-divinyl benzene and neopentylglycoldiacrylate. The particular ingredients and the ratios of the ingredients including the amount of curing agent, the curing, time, curing temperature and various other conventional parameters can be adjusted and controlled by one skilled in the art to obtain the desired optimum properties without undue experimentation.

The block copolymer compositions produced according to the present invention and having polysiloxane oils with aliphatic unsaturated organic radicals, such as, vinyl radicals, attached to silicon by carbon-silicon linkages, can be blended with peroxide curing catalysts such as benzoyl peroxide and dicumyl peroxide, to produce thermally curable extrudable mixtures useful as insulation, especially wire insulation and jacketing material. In addition, the block copolymer compositions of this invention can also be used in molded goods.

So that those skilled in the art will be better able to practice the invention, the following examples are given by way of illustration and not by way of limitation. The examples comprise the preferred and typical polymeric compositions of this invention. The proportions of the ingredients of each of the numbered example compositions are given in relative parts by weight based upon the weight of the silarylenesiloxane copolymer.

Three different silarylenesiloxane block copolymers were prepared by blending the block copolymers with fume silica, polydimethylsilicone oil containing aliphatic unsaturation and dicumylperoxide catalyst in the amounts shown in Table I below. The blends were heated at 177° C. for 20 minutes to form the block copolymer vulcanizates. The properties of the vulcanizates with oil (Examples II and III) can be compared with the properties of the vulcanizate without oil (Example I) in Table I.

EXAMPLES I–III

TABLE I

Oil Extended Silarylenesiloxane Block Copolymer Vulcanizates

| | Example No. | | |
|---|---|---|---|
| | I | II | III |
| Copolymer[1] | 100 | 100 | 100 |
| Loading of Filler[2] | 40 | 40 | 60 |
| Oil Level[3] | — | 30 | 30 |
| Dicumylperoxide | 1.5 | 1.5 | 1.5 |
| Cure | 20'/177° C. | 20'/177° C. | 20'/177° C. |
| Shore A Hardness | 79 | 73 | 74 |
| 100% Modulus, psi | 450 | 390 | 410 |
| Tensile, psi | 2100 | 1800 | 1370 |
| Elongation, % | 550 | 515 | 580 |
| Die B Tear, Pli | 395 | 295 | 490 |
| Die C Tear, Pli | 350 | 275 | 475 |
| SPG | 1.20 | 1.16 | 1.18 |
| Wgt. Loss After 72 hrs./ 232° C. | | 1.3% | 2.0% |

[1]Silarylenesiloxane block copolymer containing 20 mole percent polytetramethyl-p-silphenylene siloxane units and 80 mole percent polydimethylsiloxane units with an inherent viscosity of 2.0 dl/g at 25° C.
[2]Polydimethylsiloxane treated CAB-O-SIL MS-7 (Fumed silica).
[3]Polydimethylsilicone oil with 0.5 to 0.6 mole percent vinyl-on-chain and 20,000 centistokes viscosity.

As shown in Table I, the copolymer composition retains good physical characteristics with oil extension, showing retention of crystallite structure. The oil-extended material gives the added benefit of easier processing. A more economic product having an excellent balance of properties, and which is still easy to process can be prepared by adding a higher level of filler.

EXAMPLE IV

The cured silarylenesiloxane block copolymer composition of Example II above was heat aged at 232° C.

for 72 hours. The properties of the block copolymer composition after heat aging are set forth in Table II below.

TABLE II

Vulcanizate Properties of the Silarylenesiloxane Block Copolymer[1] After 72 hrs/232° C. Polymer contains 40 parts filler[2] and 30 parts silicone oil[3]

| | |
|---|---|
| Shore A Hardness | 74 |
| 100% Modulus, psi | 540 |
| Tensile, psi | 880 |
| Elongation, % | 270 |
| Die B Tear, Pli | 295 |
| Die C Tear, Pli | 275 |
| Specific Gravity | 1.15 |

[1]Silarylenesiloxane block copolymer containing 20 mole percent polytetramethyl-p-silphenylene siloxane units and 80 mole percent polydimethylsiloxane units with a viscosity of 2.0 dl/g at 25° C.
[2]Polydimethylsiloxane treated CAB-O-SIL MS-7 (fumed silica).
[3]Refer to Note 3 under Table I.

Acceptable properties are demonstrated by the oil extended copolymer composition even after 72 hours at 232° C. as shown in Table II. The oil extended stock still retains approximately 53% of the parent elongation after 72 hours at 232° C. while sustaining only a 1.3 percent loss in weight (See Table I).

EXAMPLE V

Oil extended silarylenesiloxane block copolymer vulcanizates were prepared by curing a blend of 100 mole percent silarylenesiloxane block copolymer containing 20 mole percent polytetramethyl-p-silphenylene siloxane units and 80 mole percent polydimethylsiloxane units with an inherent viscosity of 2.0 dl/g at 25° C., 40 parts of fumed silica and varying amounts of polydimethylsilicone oil having vinyl-on-chain groups as designated in Table III below, with 0.75 mole percent $\alpha,\alpha'$-bis(t-butylperoxy) diisopropylbenzene catalyst at 177° C. for 30 minutes. One part of a 13.0 mole percent of vinyl-on-chain polydimethylsilicone gum was added to each composition having various amounts and different types of oil shown in Table III. A post cure was carried out at 204° C. for 30 minutes. The properties of each oil extended silarylenesiloxane block copolymer can be compared with each other and with the control block copolymer having no oil additive, but containing the high vinyl gum, in Table III below:

TABLE III

Oil Extended Silarylenesiloxane Block Copolymer Vulcanizates

| Oil Type Oil Amount | None Control | PDMS[3] 20 phr | PDMS[3] 10 phr | PDMS[4] 20 phr | PDMS[4] 10 phr | PDMS[4] 5 phr |
|---|---|---|---|---|---|---|
| Durometer A | 84 | 74 | 79 | 74 | 77 | 79 |
| 100° Modulus, psi | 775 | 565 | 710 | 545 | 755 | 815 |
| Tensil, psi | 1730 | 1395 | 1465 | 1295 | 1700 | 1600 |
| Elongation, % | 260 | 270 | 270 | 230 | 260 | 240 |
| Die C Tear, lbs | 260 | 170 | 215 | 155 | 210 | 205 |

[3]Polydimethylsilicone oil with 0.5 to 0.6 mole percent vinyl-on-chain and 20,000 centistokes viscosity.
[4]Polydimethylsilicone oil with 0.6 mole percent vinyl-on-chain and 700 centistokes viscosity.

The incorporation of cure sites via the post addition of the polydimethylsiloxane gums (or fluids) containing vinyl-on-chain (VOC) groups, as shown in Example V and Table III, to silphenylene copolymers while the latter are above their crystalline melting points, results in a greater degree of control over the cross-link density. The addition of M-stopped VOC gums or fluids containing about 0.6 to about 13.5 mole percent vinyl-on-chain to provide a final mole percent vinyl-on-chain content of about 0.01–0.50 mole percent in the silarylenesiloxane copolymer provides vulcanizates which demonstrate optimum physical properties with no detectable inhibition of crystallite formation because if the crystallite structure was destroyed the vulcanizate structure would be expected to have a tensile strength of about 1000 psi typical of vulcanizates produced from non-crystalline silicone copolymers.

EXAMPLE VI

Silarylenesiloxane block copolymer was prepared in the manner set forth for the control sample in Example V using 0.6 parts of dicumyl peroxide catalyst. Upon achievement of a uniform blend the blend was divided into three portions and to each of the portions varying quantities of high vinyl-on-chain dimethylsilicone gum were added to provide a total of 0.02 mole percent, 0.11 mole percent and 0.22 mole percent, respectively, vinyl-on-chain content in the three resulting blends. Cure was carried out at 177° C. for 20 minutes, followed by post curing at 232° C. for 30 minutes for each of the three resulting blends. The physical characteristics are shown in Table IV below:

TABLE IV

Properties of Post-Cured Vulcanizates of Silarylenesiloxane Copolymers

| Total Vinyl-on-Chain Content (Mole %) | 100% Modulus (psi) | Tensile (psi) | Elongation % | Tear (Die C) | Shore A Hardness |
|---|---|---|---|---|---|
| .02 | 930 | 2130 | 500 | 560 | 85 |
| .11 | 825 | 1900 | 420 | 575 | 86 |
| .22 | 865 | 1875 | 350 | 580 | 86 |
| Control (0) | 775 | 1730 | 260 | 260 | 84 |

The addition of high vinyl-on-chain (VOC) containing polydimethylsiloxane gums or fluids to silarylenesiloxane thermoplastic elastomers represents a significant improvement over the copolymers of the prior art.

The addition of high vinyl-on-chain gum or oil permits a much broader physical property/cross-link density relationship, and it is believed that it establishes a superior cured polymer/filler matrix. The vulcanizates containing high vinyl oils demonstrate improved physical properties at either equivalent or higher degrees of cross-link density. The use of this curing technique expands the number of applications and increases the number of uses of silarylenesiloxane-thermoplastic elastomers.

Although the invention has been described with reference to certain specific embodiments thereof, numerous modifications are possible without departing from the present invention as herein disclosed, and it is desired to cover all modifications falling within the spirit and scope of the invention.

What is claimed is:

1. A curable silicone elastomer composition blend consisting essentially of a silarylenesiloxane copolymer, a dimethylsilicone oil bearing vinyl-type unsaturation for effecting cross-linking of said silarylenesiloxane copolymers with said dimethylsilicone oil, a catalyst and a filler.

2. The composition of claim 1, wherein the silarylenesiloxane is a silarylenesiloxane-polydiorganosiloxane block copolymer made up of units of silarylenesiloxane having the general formula:

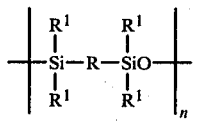

and diorganopolysiloxane of the general formula:

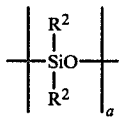

wherein n is an integer equal to 1 to about 100, R is a divalent aromatic organic radical, $R^1$ is a monovalent organic radical, a is an integer equal to from about 5 to about 10,000 inclusive, and $R^2$ is an organic radical selected from the group consisting of monovalent hydrocarbon radicals, unsaturated aliphatic radicals and halogenated radicals.

3. The composition of claim 2, wherein $R^2$ is selected from the group consisting of methyl radicals, ethyl radicals, and combinations of methyl and ethyl radicals.

4. The composition of claims 2 or 3, wherein R is a phenylene radical and $R^1$ is a methyl radical.

5. The composition of claim 2, wherein a has a value of about 26 and n has a value from about 4 to about 6.

6. The composition of claim 1, wherein the dimethylsilicone oil contains a low level of vinyl-type unsaturation.

7. The composition of claims 1 or 6 wherein the dimethylsilicone oils have a level of vinyl-type unsaturation in the range of about 0.05 mole percent vinyl to about 0.7 mole percent vinyl based on silarylenesiloxane copolymer.

8. The composition of claim 1, wherein the dimethylsilicone oil has a viscosity of about 500 to about 25,000 centistokes.

9. The composition of claim 1, wherein the dimethylsilicone oil is present in an amount from about 1 to about 40 parts per hundred parts of the silarylenesiloxane copolymers.

10. The composition of claim 1, wherein the dimethylsilicone oil is present in an amount from about 5 to about 10 parts per hundred parts of the silarylenesiloxane copolymer.

11. The composition of claim 1, wherein the dimethylsilicone oil has a level of vinyl-type unsaturation of about 0.5 to about 0.6 mole percent and has a viscosity of about 20,000 centistokes.

12. The composition of claim 1, wherein the dimethylsilicone oil has a level of vinyl-type unsaturation of about 0.6 mole percent and of about 700 centistokes.

13. The composition of claim 1, wherein the catalyst is present in an amount from about 0.1 to about 10.0 parts per hundred parts of the silarylenesiloxane copolymer.

14. The composition of claim 1, wherein the catalyst is present in an amount from about 0.2 to about 2.0 parts per hundred parts of the silarylenesiloxane copolymer.

15. The composition of claims 1, 13 or 14, wherein the catalyst is an organotertiary peroxide.

16. The composition of claims 13 or 14, wherein the organotertiary peroxide catalyst is dicumylperoxide or α,α'-bis(t-butylperoxy)diisopropylbenzene.

17. The composition of claim 1, wherein the filler is present in an amount up to about 80 parts per hundred parts of the silarylenesiloxane copolymer.

18. The composition of claims 1 or 17, wherein the filler is fumed silica.

19. The cured composition of claim 1.

20. A silicone elastomer composition blend consisting essentially of a silarylenesiloxane copolymer, a dimethyl silicone oil bearing a low level of vinyl-type unsaturation, a catalyst, a filler, and a dimethyl silicone oil bearing a high level vinyl-type unsaturation.

21. The composition of claim 20 wherein the dimethyl silicone oil bearing a high level of vinyl is a dimethyl silicone gum.

22. A method of preparing silicone elastomer composition blends consisting essentially of curing a mixture of silarylenesiloxane copolymer, a dimethyl silicone oil bearing a low level of vinyl-type unsaturation, a catalyst and optionally, a filler; adding a dimethyl silicone oil bearing a high level of vinyl-type unsaturation to the cured blend; and post-curing the mixture by additional heating.

23. The method of claim 22 consisting essentially of heating the mixture at about 100° C. to about 200° C. for about 5 minutes to about 2.0 hours to cure the copolymer and heating the cured copolymer containing the additional extender material at about 150° C. to about 275° C. for about 5 minutes to about 2.0 hours to post-cure the copolymer.

24. A curable silicone elastomer composition blend consisting essentially of a silarylenesiloxane copolymer a dimethylsilicone oil bearing a high level of vinyl-type unsaturation, a catalyst and, optionally, a filler.

25. The composition of claim 24, wherein the silarylenesiloxane is a silarylenesiloxane-polydiorganosiloxane block copolymer made up of units of silarylenesiloxane having the general formula:

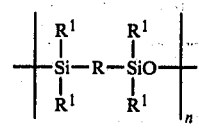

and diorganopolysiloxane of the general formula:

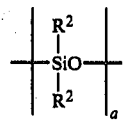

wherein n is an integer equal to about 100, R is a divalent aromatic organic radical, $R^1$ is a monovalent organic radical, a is an integer equal to from about 5 to about 10,000 inclusive, and $R^2$ is an organic radical selected from the group consisting of monovalent hydrocarbon radicals, unsaturated aliphatic radicals and halogenated radicals.

26. The composition of claim 24 wherein the dimethylsilicone oils have a level of vinyl-type unsaturation in the range of about 0.6 mole percent vinyl to about 13.5 mole percent vinyl based on silarylenesiloxane copolymer.

* * * * *